United States Patent [19]

Hosaka

[11] 4,455,031

[45] Jun. 19, 1984

[54] WHEELCHAIR

[76] Inventor: Wayne N. Hosaka, 1626 Walnut Ave., San Diego, Calif. 92103

[21] Appl. No.: 325,557

[22] Filed: Nov. 27, 1981

[51] Int. Cl.[3] .................................... B62M 1/00

[52] U.S. Cl. .................... 280/242 WC; 180/907; 280/701; 280/726; 297/DIG. 4

[58] Field of Search ......... 180/DIG. 3; 280/242 WC, 280/286, 289 WC, 701, 705, 690, 725, 726; 197/DIG. 4

[56] References Cited

U.S. PATENT DOCUMENTS

| | | | |
|---|---|---|---|
| 3,191,990 | 6/1965 | Rugg et al. | 297/83 |
| 3,692,323 | 9/1972 | Sekine | 280/701 |
| 3,806,151 | 4/1974 | Prasniewski | 280/701 |
| 3,901,337 | 8/1975 | Cragg | 180/907 |
| 4,078,817 | 3/1978 | Ferguson et al. | 280/242 |
| 4,183,578 | 1/1980 | Naganawa | 297/90 |

FOREIGN PATENT DOCUMENTS

| | | | |
|---|---|---|---|
| 640765 | 7/1950 | United Kingdom | 280/242 |

*Primary Examiner*—John A. Pekar
*Assistant Examiner*—D. Lynn Fugate
*Attorney, Agent, or Firm*—Charles C. Logan, II

[57] ABSTRACT

A wheelchair having a chair frame, a pair of front wheels, independent front wheel suspension for the front wheels, a pair of rear wheels, and a rear suspension assembly for said rear wheels. The chair frame has a pair of laterally spaced side frame assemblies, a seat frame assembly connected between the laterally spaced frame assemblies, a pair of arm rest assemblies detachably attached to the top of the respective side frame assemblies, and a back rest assembly detachably connected between said arm rest assemblies. The independent wheel suspension assembly has a laterally extending left front wheel support arm having the left front wheel attached thereto, adjacent its free end and the opposite end of the support arm is pivotally connected to the chair frame. A laterally extending right front wheel support arm has the right front wheel attached thereto adjacent its free end and the opposite end of the support arm is pivotally connected to the chair frame. A rear suspension support frame has its front end pivotally connected to the chair frame and the left and right rear wheels are attached to the opposite lateral sides of the rear suspension support frame. A shock absorber has its top end connected to the seat portion of the chair frame and its bottom end is connected to the rear suspension support frame.

6 Claims, 7 Drawing Figures

WHEELCHAIR

BACKGROUND OF THE INVENTION

This invention relates to a new and useful wheelchair structure, and more particularly to a novel front wheel suspension structure and a novel rear wheel suspension structure.

In the past wheelchairs have been designed with various types of structures that have been meant to make the passenger more comfortable during their ride and confinement therein. While concentrating primarily on the reclining mechanism for these wheelchairs, there designers have failed to give adequate thought to the suspension system for the wheelchair. One example of such a wheelchair is illustrated in U.S. Pat. No. 3,191,990.

A more recent wheelchair structure is illustrated in U.S. Pat. No. 4,183,578. Again the emphasis of the invention has been directed to the reclining structure aspects of the wheelchair while complete neglect has been given to the suspension system for the wheelchair.

One of the practical problems that exist for the rider in the present day wheelchairs, is the severe shock vibrations that are transmitted from the wheels of the wheelchair through the chair frame thereof when the wheelchair travels across bumpy terrain and over holes in the traveling surface. These vibratory shocks are transmitted directly through the wheelchair to the rider much to the riders discomfort.

It is an object of the invention to provide a novel independent front wheel suspension system for a wheelchair.

It is also an object of the invention to provide a novel rear wheel suspension system for a wheelchair.

It is another object of the invention to provide a novel rear suspension frame having its front end pivotally connected to the chair frame of a wheelchair.

SUMMARY OF THE INVENTION

The novel wheelchair has a chair frame, a pair of front wheels, independent front wheel suspension, a pair of rear wheels, and a shock absorber suspension for the rear wheels.

The chair frame has a pair of laterally spaced side frame assemblies with a seat frame assembly connected therebetween. A pair of arm rests assemblies are detachably attached to the top of the respective side frame assemblies. A back rest assembly is detachably connected between the arm rest assemblies.

The independent front wheel suspension is mounted on a support plate that is attached to the lower front end of the chair frame. Attached to the underside of the support plate are a pair of laterally spaced brackets to which are attached pivot ends of the respective left and right front wheel support arms. These front wheel support arms extend laterally and have the respective left and right front wheels attached to their free ends. The elongated shape of each of the support arms is such that the pivot end of the arms initially travels along an x-axis and then curves outwardly away from the x-axis during its intermediate portion and then returns to the x-axis at the free end portion of the support arm. There are springs connected between the bottom of the support plate and the free ends of the respective front wheel support arms and these act as shock absorbers to dampen the shock when the front wheels pass over rough surfaces or drop into holes over which they are passing. These springs have adjustment structure to vary the amount of flexibility of these springs. The support plate is oriented at a forwardly inclined angle to the horizontal plane in order to give improved ride characteristics to the wheelchair.

The rear suspension system of the wheelchair has a rear suspension support frame having its front end pivotally connected to the chair frame. The shock absorber has its top end connected to the underside of the seat portion of the chair frame and its bottom end connected to the rear suspension support frame. The left and right rear wheels are attached to the opposite lateral sides of the rear suspension support frame. It is this shock absorber that cushions the ride of the wheelchair user as the rear wheels go over rough terrain or drop into holes in the surface over which they travel.

Each of the rear wheels has its own electric motor and related structure for driving that rear wheel.

DESCRIPTION OF THE PREFERRED EMBODIMENT

Figure 1:
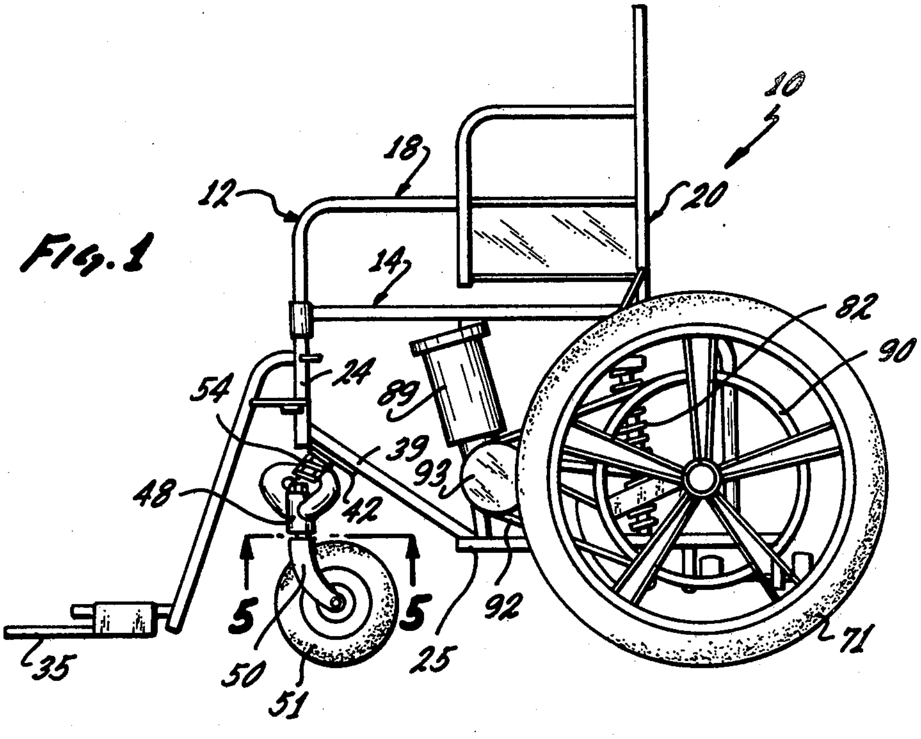
FIG. 1 is a side elevation view of the novel wheelchair.
Figure 2:
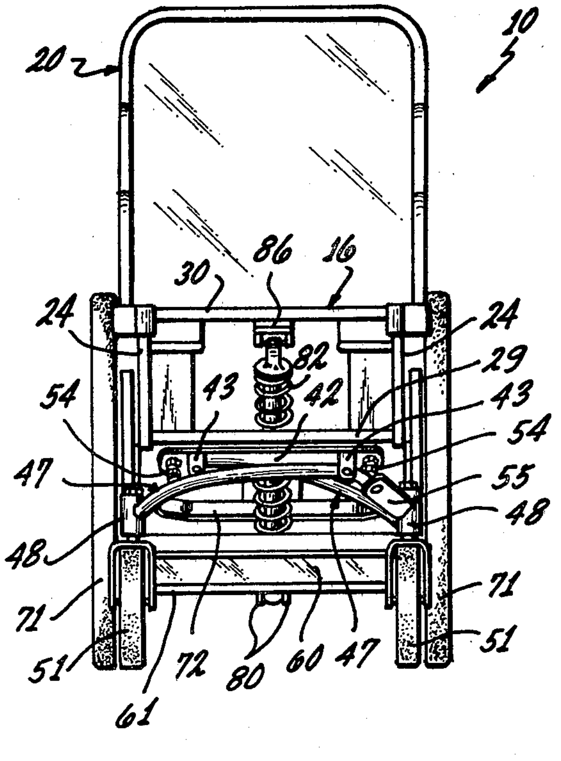
FIG. 2 is a front elevation view of the novel wheelchair.
Figure 3:
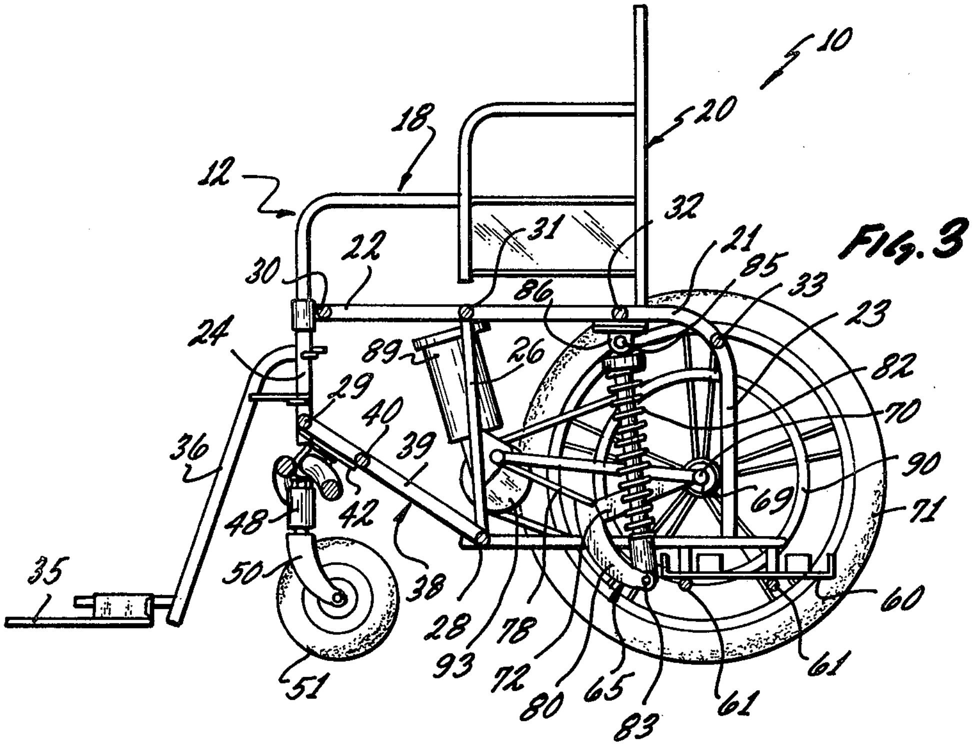
FIG. 3 is a cross sectional side elevation view of the novel wheelchair.
Figure 4:
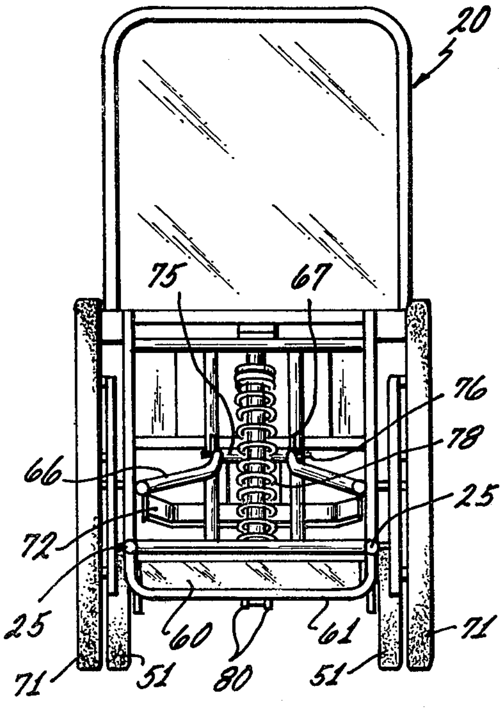
FIG. 4 is a rear elevation view of the novel wheelchair.
Figure 5:
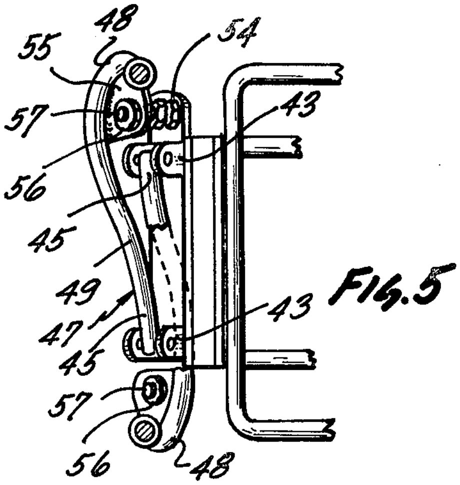
FIG. 5 is an isolated view of the laterally extending left and right front wheel support arms and their attachment to the support brackets.

Applicant's novel wheelchair will be described by referring to FIGS. 1–5. The wheelchair is generally designated numeral 10.

The basic structure of the wheelchair is the chair frame 12. It has a pair of laterally spaced side frame assemblies 14 a seat frame 16 connected between laterally spaced side frame assemblies 14, a pair of arm rest assemblies 18 detachably attached to the top of the respective side frame assemblies 14, and a back rest assembly 20 detachably connected between the arm rest assemblies 18.

The side frame assemblies 14 are identical and only one of them will be described. Side frame assembly 14 has an L-shaped frame member having legs 22 and 23. Attached to the end of leg 22 at its forward end is upright frame member 24 attached at the lower end of leg 23 is horizontal frame member 25. A brace 26 connects leg 22 to horizontal frame member 25.

The side frame assemblies are connected together by cross frame members 28, 29, 30, 31, 32, and 33. A pair of foot plates 35 are connected by foot pipes 36 to upright frame members 24 of side frame assemblies 14.

A front suspension support frame 38 is formed from inclined frame members 39 and cross frame member 40. The lower end of inclined frame members 39 are attached to cross frame member 28 and the top ends of inclined frame members 39 are attached to cross frame member 29. A support plate 42 is attached to the underside of front suspension support frame 38. A pair of laterally spaced brackets 43 are attached to the underside of support plate 42. The pivot end portions 45 of laterally extending front wheel support arms 47 are pivotally connected to brackets 43. The wheel support end portion 48 of support arms 47 detachably receive casters 50 of front wheels 51. The elongated shape of each of these support arms 47 is such that the pivot end portion 45 of the arms initially travels along an x-axis and then curves outwardly away from the x-axis during its intermediate portion 49 and then returns to the x-axis at the free end portion 48 of the support arm 47. Springs 54 are connected between the bottom of support plate 42 and the supporting flat 55 formed on the wheel support end portion 48 of the support arm 47. By tightening the nut 56 on bolt 57 the flexibility of spring 54 may be adjusted. Support plate 42 is oriented at a forwardly inclined angle to the horizontal plane to give improved ride characteristics to the wheelchair.

A battery support platform 60 is attached to the top of U-shaped cross member 61 that have their opposite ends connected to frame members 25.

The rear suspension support frame assembly 65 has a yoke shaped rear suspension support frame 66 having its front end pivotally connected to brackets 67 attached on vertical brace members 26. The lateral sides of the rear suspension support frame 66 are attached to hubs 69 through which pass shafts 70 upon which the rear wheels 71 are mounted. A tie rod bar 72 also has its opposite ends connected to hub 69. The central portion of rear suspension support frame 66 has a tubular section 75 throughwhich passes a shaft 76 to allow member 66 to pivot around bracket 67. A plate 78 is attached between the central portion 75 of member 66 and tie rod bar 72. Attached to the bottom of plate 78 are a pair of laterally spaced arcuate arm members 80. A shock absorber unit 82 has its lower end pivotally attached by pin 83 to arcuate arm members 80 and its top end is pivotally attached by pin 85 that passes through bracket 86 attached to the under side of the seat support frame cross member 32. An electric motor 89 is mounted on each of the braces 26 and they drive the pulleys 90 on the rear wheels 71 by a drive belt 92 that passes around pulleys 93.

Figure 6:
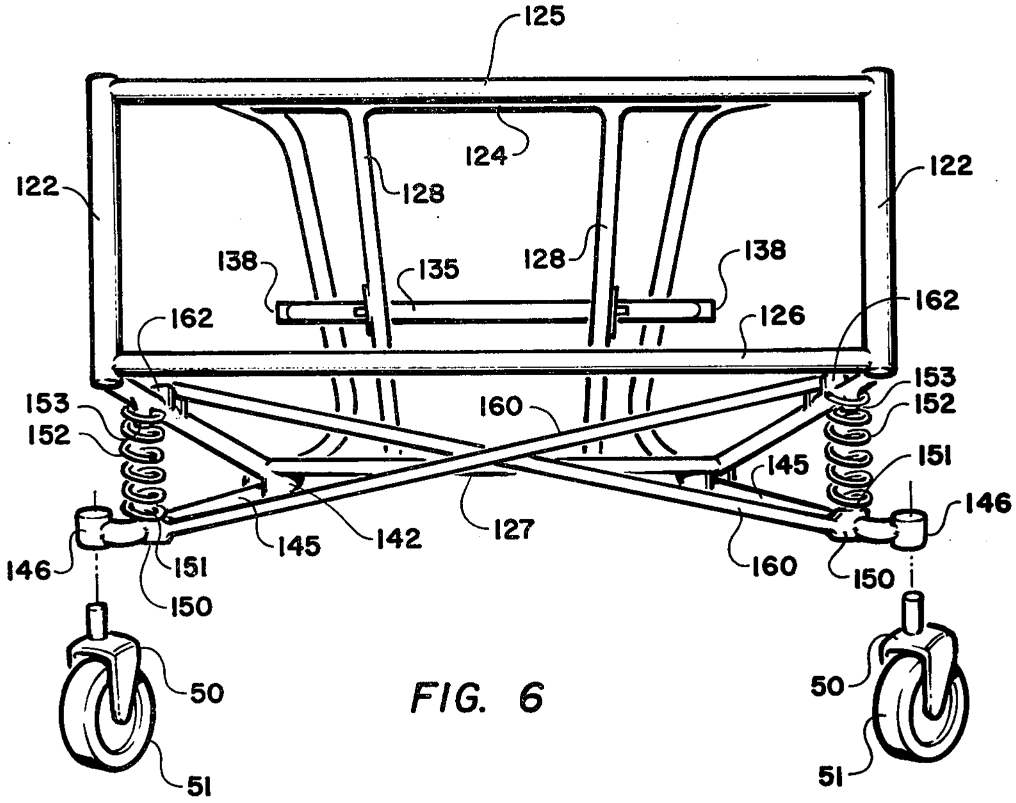
FIG. 6 is a front view of an alternative type of independent front wheel suspension mounted upon a chair frame having differently configured side frame assemblies.
Figure 7:
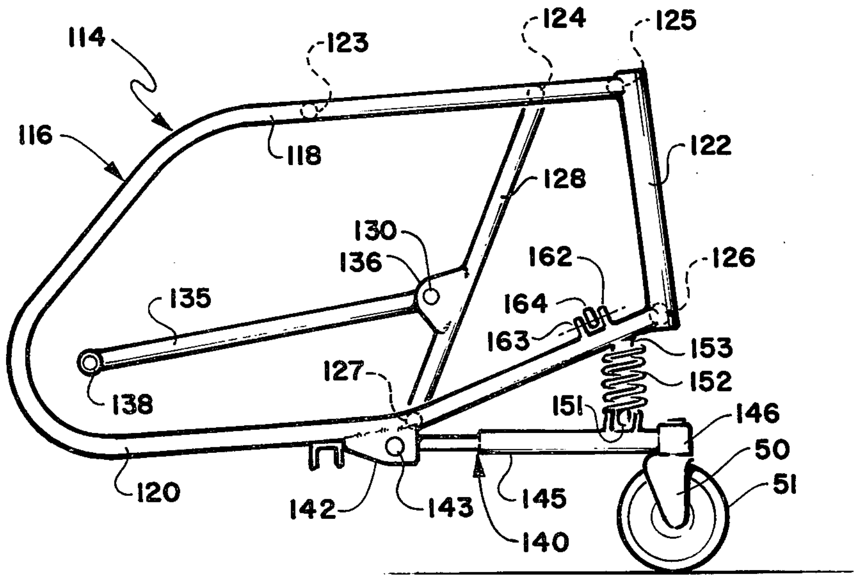
FIG. 7 is a side elevation view of the alternative type of independent front wheel suspension illustrated in FIG. 6.

An alternative type of independent front wheel suspension is illustrated in FIGS. 6 and 7. The chair frame to which is attached is different from the chair frame 12 by a limited degree. The alternative side frame assemblies are designated numeral 114. Since they are identical only one of them will be described.

Side frame assembly 114 is basically comprised from a U-shaped lateral frame member 116 whose orientation has been rolled over upon its side and it has a top leg portion 118 and a bottom leg portion 120. Attached to the forward end of top leg portion 118 and bottom leg portion 120 is an upright frame member 122.

The side frame assemblies 114 are connected together by cross frame members 123, 124, 125, 126, and 127.

Upright frame members 128 have their top ends attached to cross frame members 124 and their bottom ends attached to cross frame member 127. A pair of brackets 130 are attached on upright frame members 128. A yoke shaped rear suspension support frame 135 has its front end pivotally connected to a shaft 136 that is captured between the bracket 130. The lateral sides of the yoke shaped rear suspension support frame 135 have hubs 138 on their ends and a shaft such as 70 of the previous embodiment pass through these hubs and also be connected to rear wheels 71.

A front suspension assembly 140 is attached to the front bottom end of side frame assembly 114. Brackets 142 are attached to the under side of bottom leg portions 120. A pivot pin 143 passing through an aperture in the end of support arm 145 pivotally attaches the support arm 145 thereto. The other end of support arm 145 has a caster mount 146 into which a pin mounted vertically atop caster 50 is pivotally mounted. Mounted inwardly from the forward ends of support arm 145 is a bracket 150 having a spring seat 151 formed on its top surface. The bottom of a spring 152 is captured on spring seat 151 while its top end is captured by a stub 153 extending downwardly from the hub surface of the forward portion of bottom leg 120. Tie rods 160 have their one end connected to bracket 150 and their opposite end pivotally attached to bracket 162 by a bolt 163 passing through an aperture in the head 164 of tie rod 160. The structure described above allows for independent up and down travel for each of the front wheels 51 as support arms 145 pivot about brackets 142. The tie rods 160 maintain the integrity of the front suspension throughout the up and down travel of the support arm 145.

What is claimed is:

1. A wheelchair comprising:
- a chair frame having a pair of laterally spaced side frame assemblies, a seat frame assembly connected between said laterally spaced side frame assemblies, a pair of arm rest assemblies detachably attached to the top of said respective side frame assemblies, and a back rest assembly detachably connected between said arm assemblies;
- a left front wheel and a right front wheel;
- independent front wheel suspension means attached between the lower front end of said chair and said respective left and right front wheels comprising:
  - a laterally extending left front wheel support arm having said left front wheel attached thereto adjacent its free end and its opposite end being pivotally connected to said chair frame;
  - a laterally extending right front wheel support arm having said right front wheel attached thereto adjacent its free end and its opposite end being pivotally connected to said chair frame;
  - the elongated shape of each of said support arms is such that the pivot end of said arms initially travels along an x-axis and then curves outwardly away from said x-axis during its intermediate portion and then returns to said axis at the free end portion of said support arm; and
  - a support plate having laterally spaced brackets attached to its underside, the pivot ends of said support arms being pivotally connected to said brackets;
- a left rear wheel and a right rear wheel; and
- means connecting said rear wheels to said chair frame.

2. A wheelchair as recited in claim 1 further comprising spring means connected between the bottom of said support plate and the free end of said respective front wheel support arms.

3. A wheelchair as recited in claim 2 further comprising variable spring flexibility adjustment structure.

4. A wheelchair as recited in claim 1 wherein said support plate is oriented at a forwardly inclined angle to the horizontal plane to give improved ride characteristics to said wheelchair.

5. A wheelchair comprising:

a chair frame having a pair of laterally spaced side frame assemblies, a seat frame assembly connected between said laterally spaces side frame assemblies, a pair of arm rest assemblies detachably attached to the top of said respective side frame assemblies, and a back rest assembly detachably connected between said arm assemblies;

a left front wheel and a right front wheel;

independent front wheel suspension means attached between the lower front end of said chair frame and said respective left and right front wheels comprising:

a left front wheel support arm having its rear end pivotally attached to a bracket on the underside of said left side frame assembly; a right front wheel support arm having its rear end pivotally attached to a bracket on the underside of said right frame assembly; and shock absorber means having their one ends attached to said left and right wheel support arms and their other ends attached to said respective side frame assembly;

a left rear wheel and a right rear wheel; and means connecting said rear wheels to said chair frame.

6. A wheelchair assembly as recited in claim 5 wherein said independent front wheel suspension further comprises: at least one tie rod having its opposite ends attached to said right front wheel support arm and to said left frame assembly respectively; and at least one tie rod having its opposite ends attached to said left front wheel support arm and to said right frame assembly respectively.

* * * * *